United States Patent [19]

Blahak et al.

[11] 4,152,510

[45] May 1, 1979

[54] POLYURETHANE ELASTOMERS AND A PROCESS FOR THEIR PRODUCTION

[75] Inventors: Johannes Blahak, Leverkusen; Walter Meckel, Neuss; Erwin Muller, Leverkusen, all of Fed. Rep. of Germany

[73] Assignee: Bayer Aktiengesellschaft, Leverkusen, Fed. Rep. of Germany

[21] Appl. No.: 844,763

[22] Filed: Oct. 25, 1977

Related U.S. Application Data

[63] Continuation of Ser. No. 477,949, Jun. 10, 1974, abandoned, which is a continuation of Ser. No. 105,639, Jan. 11, 1971, abandoned.

[30] Foreign Application Priority Data

Jan. 16, 1970 [DE] Fed. Rep. of Germany ....... 2001772

[51] Int. Cl.$^2$ ...................... C08G 18/32; C08G 18/65
[52] U.S. Cl. ................................. 528/68; 260/465 E; 260/578; 528/63
[58] Field of Search ................. 260/75 NH, 77.5 AM; 528/63, 68

[56] References Cited

U.S. PATENT DOCUMENTS

| | | | |
|---|---|---|---|
| 3,036,996 | 5/1962 | Kogon | 260/77.5 AM |
| 3,660,326 | 5/1972 | Mallabar | 260/18 TN |

*Primary Examiner*—H. S. Cockeram
*Attorney, Agent, or Firm*—Gene Harsh; Joseph C. Gil

[57] ABSTRACT

Novel polyurethane elastomers having excellent physical properties are prepared utilizing as chain extenders aromatic diamine compounds having the general formula

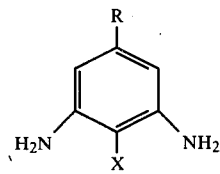

wherein R is hydrogen, $C_1$ to $C_4$ alkyl, halogen, C≡N, $CF_3$ or $SO_2$—Z wherein Z is $C_1$ to $C_4$ alkyl, several of which diamine compounds are hitherto unknown in the art.

2 Claims, No Drawings

POLYURETHANE ELASTOMERS AND A PROCESS FOR THEIR PRODUCTION

This is a continuation of application Ser. No. 477,949 filed June 10, 1974, which itself is a continuation of application Ser. No. 105,639 filed Jan. 11, 1971, both now abandoned.

This invention relates to polyurethane elastomers, the preparation thereof and more particularly to the use of certain aromatic diamines as chain extenders in the preparation of polyurethane elastomers.

Aromatic diamines and their use as chain lengthening agents in the production of polyurethane elastomers which contain urea, are well known in the art and are described for example in German Patent Specification No. 953,116 and U.S. Pat. No. 3,036,996.

It is also known that polyurethane elastomers which have good physical properties may be obtained by using glycols as chain lengthening agents and naphthylene-1,5-diisocyanate, and that when diamines are used as chain lengthening agents, tolylene diisocyanate, which is commercially obtainable, can be used in the production of elastomeric polyurethane resins, although in the latter case the polyurethanes do not reach the same high level of quality as the first mentioned polyurethanes. A typical example of an aromatic diamine much used at the present time as a chain lengthening agent is 3,3'-dichloro-4,4,'-diaminodiphenylmethane, which gives rise to polyurethane elastomers of only medium quality.

It is therefore an object of this invention to provide new polyurethane elastomers. It is another object of this invention to provide polyurethane elastomers having superior elastic qualities as well as high hardness, superior tensile strength and resistance to hydrolysis. Another object of this invention is to provide a process for the preparation of polyurethane elastomers. A further object of this invention is to provide a process for the preparation of polyurethane elastomers using aromatic diamines as chain extenders. Still a further object of this invention is to provide new aromatic diamines.

The foregoing objects and others which will become apparent from the following description are accomplished in accordance with the invention, generally speaking, by providing polyurethane elastomers which contain structural units of the formula

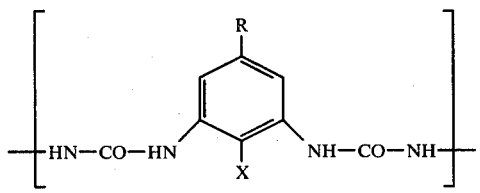

wherein

R represents a hydrogen atom, $C_1$ to $C_4$ alkyl radicals, halogen atoms, a $C{\equiv}N$ group, a $CF_3$ group or an $SO_2-Z$ group, wherein Z represents $C_1$ to $C_4$ alkyl radicals, and X represents fluorine, chlorine or bromine atoms.

Polyurethane elastomers of a type which contain structural units of the formula

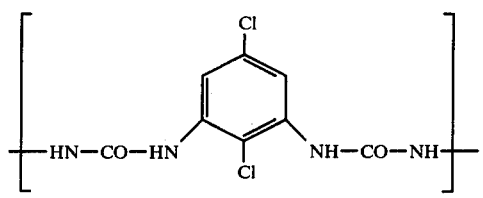

are particularly preferred.

Polyurethane elastomers of the foregoing description are prepared by reacting polyhydroxyl compounds having a molecular weight of from about 800 to about 5000 with diisocyanates using as chain lengthening agents aromatic diamines having the general formula

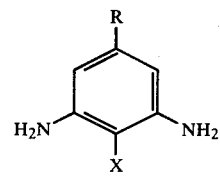

wherein

R represents a hydrogen atom, $C_1$ to $C_5$ alkyl radicals, halogen atoms, a $C{\equiv}N$ group, $CF_3$ group or an $SO_2-Z$ group, wherein Z represents $C_1$ to $C_4$ alkyl radicals, and X represents fluorine, chlorine or bromine atoms.

Some examples of diamine chain lengthening agents preferred for use according to the process of the invention are

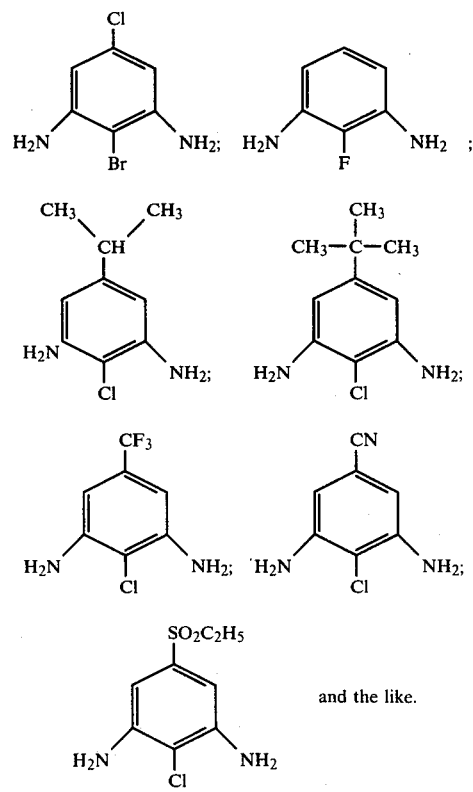

and the like.

Diamines which are particularly preferred for use according to the invention are those having the formula

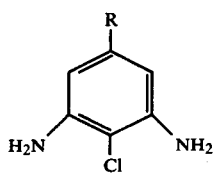

wherein

R represents hydrogen, $C_1$ to $C_4$ alkyl radicals or F, Cl or Br atoms, of which the following are preferred

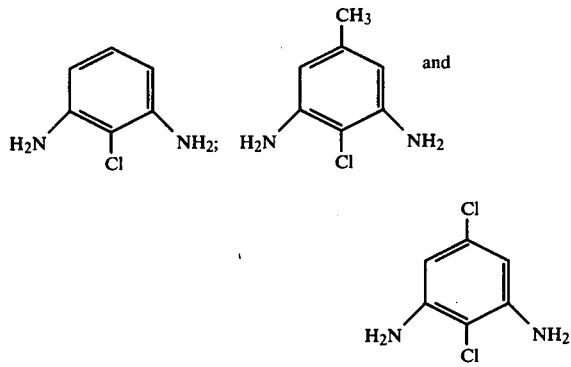

It is especially advantageous to employ

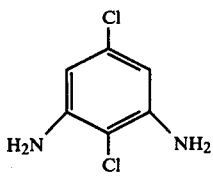

in the process of the invention.

The present invention also relates to diamines having the formula

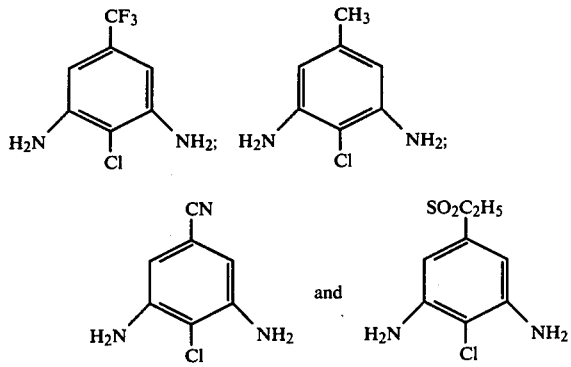

which have not hitherto been known in the art.

The diamine chain lengthening agents used according to the invention not only impart very advantageous properties to the new polyurethane elastomers, but their use has the additional advantage in that the reactivity of the amino groups can be controlled by suitable choice of the substituents R and X.

The diamines used in the preparation of polyurethane elastomers are prepared by known methods. Thus, for example, one method of preparation begins with the corresponding dinitrophenols of the general formula

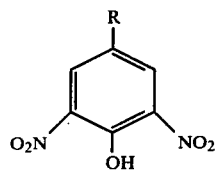

in which R represents a hydrogen atom, $C_1$ to $C_4$ alkyl radicals, halogen atoms, a $C \equiv N$ group, a $CF_3$ group or an $SO_2—Z$ group wherein Z represents $C_1$ to $C_4$ alkyl radicals. The phenolic OH group is replaced by a nucleophilic reaction with halogen atoms, and the nitro groups are subsequently reduced to the corresponding amino groups. The nucleophilic replacement of the phenolic OH group by halogen may be carried out, for example, with $SOCl_2$ or preferably with phosgene in the presence of equivalent quantities of tertiary bases. The preparation of the chain lengthening agents used according to the invention are further illustrated by the following examples.

In the preparation of 1-chloro-2,6-diaminobenzene, for example, the readily accessible 4-chloro-3,5-dinitrosulphonic acid is reacted with ammonia to form 4-amino-3,5-dinitrosulphonic acid, which is easily desulphonated. The resulting 1-amino-2,6-dinitrobenzene is reduced after replacement of the amino group by chlorine.

In the preparation of 4-chloro-3,5-diaminotoluene and of 1,4-dichloro-3,5-diaminobenzene, the corresponding dinitrocresol or dinitrophenol is used as starting material and the hydroxyl group is replaced nucleophilically by halogen, using the corresponding acid chlorides in the presence of equivalent quantities of tertiary bases.

As starting material for the polyurethanes according to the invention conventional polyhydroxyl compounds may be used which have a molecular weight of from about 800 to about 5000, such as, for example, linear or slightly branched polyesters which contain terminal hydroxyl groups, which are well known in the art and may be prepared by known processes, for example, from monohydric or polyhydric alcohols and carboxylic acids or hydroxycarboxylic acids, optionally with the addition of amino alcohols, diamines, hydroxylamines and diamino alcohols. These polyesters may also contain double or triple bonds of unsaturated fatty acids. Linear or slightly branched polyesters of the type which can be obtained by the polymerization of alkylene oxides such as ethylene oxide, propylene oxide, epichlorohydrin or tetrahydrofuran are also suitable. Copolymers of this type may also be used. Linear or branched addition products which can be prepared by the addition of the above mentioned alkylene oxides to, for example, polyfunctional alcohols, amino alcohols or amines are also suitable. As examples of polyfunctional starting compounds for the addition of the alkylene oxides there may be mentioned ethylene glycol, 1,2-propylene glycol, hexane-1,6-diol, ethanolamine and ethylene diamine and the like. A certain amount of trifunctional starting components such as, for example, trimethylolpropane, glycerol, sorbitol, cane sugar and the like may also be included. Mixtures of linear and/or slightly branched polyalkylene glycol ethers of various types may, of course, also be used. Polyacetals, polythioethers or polycarbonates and mixtures of various compounds which contain at least two OH groups and which have a molecular weight of from about 800 to about 5000 may also be used. It is often preferred to use difunctional hydroxyl compounds either exclusively or predominantly.

Any poyisocyanate may be used as a starting material for the production of the polyurethane elastomers according to the invention, some of which are for example, aliphatic diisocyanates, such as ethylene diisocyanate, butane-1,4-diisocyanate, hexane-1,6-diisocyanate and octomethylene-1,8-diisocyanate and the like. Carboxylic acid ester diisocyanates, cycloaliphatic diisocyanates such as, for example, 1-methylcyclohexane-2,4- and 2,6-diisocyanate and any mixtures of these isomers; cyclohexane-1,4- and 1,3-diisocyanate, 4,4'-dicyclohexylmethane diisocyanate, isophorone diisocyanate and the like. Araliphatic diisocyanates such as, for example, xylylene-1,3-and 1,4-diisocyanate and the like. Aromatic diisocyanates such as, for example, tolylene-2,4- and 2,6-diisocyanate as well as any mixtures of these isomers, phenylene-1,3- and 1,4-diisocyanate, 4,4'-diphenylmethane diisocyanate and 1,5-naphthylene diisocyanate and the like. Triisocyanates such as, for example, 1,3,5-benzene triisocyanate or 4,4',4"-triphenylmethane triisocyanate may also be used in certain amounts. 2,4- and 2,6-tolylene diisocyanates and isomeric mixtures thereof, 4,4'-diphenylmethane diisocyanate and 1,5-naphthylene diisocyanate are particularly preferred according to the process of the invention. The diisocyanates used may also advantageously be reaction products of about 2 mols of diisocyanates with about 1 mol of a low molecular weight branched or unbranched diol to which certain amounts of triols may be added, especially in cases where higher NCO values are desired in the prepolymer.

The quantities of reactants are generally chosen such that the molar ratio of diisocyanates to the chain lengthening agent plus the compound containing reactive OH groups, which depends on the particular working up process employed, will be generally between about 0.9 and about 1.5, preferably between about 1.05 and about 1.25. If the product is produced via the prepolymer stage, the percentage NCO content in the prepolymer may be between about 3 percent and about 15 percent by weight. The molar ratio of the $NH_2$ groups of the chain lengthening agent to reactive OH groups may vary within wide limits and should preferably be between about 0.4 and about 1.5, in which case products varying from soft to hard are respectively obtained.

The process according to the invention may be carried out in various manners. Thus, for example, the compound which contains at least two hydroxyl groups may be reacted with an excess of diisocyanate and, after the addition of the chain lengthening agent according to the invention, the melt may be poured into molds. After several hours heating, a high grade elastic polyurethane resin is obtained.

Another method comprises reacting the higher molecular weight compound which contains at least two hydroxyl groups in an excess of diisocyanate in admixture with the chain lengthening agent used according to the invention and molding the reaction product at elevated temperature under pressure after it has been granulated. Depending on the proportions in which the reactants are used, polyurethane resins of different degrees of hardness and elasticity are obtained. Synthetic resins which can be worked up like thermoplastics are also produced in this manner. Still another method comprises reacting the higher molecular weight compound which contains at least two hydroxyl groups in admixture with the diamine chain lengthening agent with a subequivalent amount of diisocyanate, a rollable sheet being obtained which can be converted into a rubbery elastic polyurethane resin by cross-linking it with additional diisocyanate.

They may also be modified by the usual additives such as dyes, pigments or fillers in procedures well known to those skilled in the art.

The products according to the invention have a wide variety of uses such as, for example, the production of molded products used in the construction of machinery and vehicles, particularly in the manufacture of cone belts, gear wheels, bearing sockets, seals, membranes and the like.

The invention is further illustrated but it is not intended that it be limited by the following examples in which all parts and percentages are by weight unless otherwise indicated. It is further understood that one skilled in the art may substitute materials given as suitable herein for their counterparts in the following examples.

EXAMPLE 1

About 200 parts of a polyester (OH number 56) obtained from adipic acid and ethylene glycol are dehydrated in a vacuum at about 130° C. and about 40 parts of an isomeric mixture of about 80% of 2,4- and about 20% of 2,6-tolylene diisocyanate are added at about 120° C. The reaction mixture is then stirred for about 30 minutes and freed from air by applying a vacuum for about 30 seconds, and about 14.3 parts of 1-chloro-2,6-diaminobenzene which has previously been melted are then poured in with stirring. After about 20 seconds, the liquid reaction mixture is poured into preheated molds in which it solidifies within a few minutes. After about 24 hours heating at about 100° C., a polyurethane elastomer which has the following properties is obtained.

| | |
|---|---|
| Tensile strength (DIN 53504) | 314 (kg/cm$^2$) |
| Elongation at break (DIN 53504) | 578% |
| Shore hardness A (DIN 53505) | 93 |
| Elasticity (DIN 53512) | 45 |
| % tensile strength after 7 days at 70° C., 90% relative humidity | 74 |

Comparison Example

The same procedure is employed as in Example 1 but instead of about 14.3 parts of the diamine of Example 1 there are used about 27 parts of 3,3'-dichloro-4,4'-diaminodiphenylmethane as chain lengthening agents. The following properties are obtained.

| | |
|---|---|
| Tensile strength (DIN 53504) | 242 (kg/cm$^2$) |
| Elongation at break (DIN 53504) | 509% |
| Shore hardness A (DIN 53505) | 84 |
| Elasticity (DIN 53512) | 31 |
| % tensile strength after 7 days at 70° C., 90% relative humidity | 41 |

EXAMPLE 2

(a) Preparation of 1-methyl-4-chloro-3,5-diaminobenzene.

About 100 parts (0.43 mol) of 4-hydroxy-3,5-dinitrotoluene, about 750 parts by volume of phosphorus oxychloride and about 1250 parts by volume of diethylaniline which has been dried over calcium carbonate are heated together to about 90° C. for about 2½ hours with stirring. The reaction mixture is poured onto ice and extracted with methylene chloride, and the methylene chloride is removed in a rotary evaporator. After recrystallization from ethanol, about 65 parts of 4-chloro-3,5-dinitrotoluene of melting point of about 112° C. to about 113° C. about 70% of the theoretical yield is obtained. About 52 parts (0.24 mol) of this isolated compound are dissolved in about 500 parts by volume of toluene and added dropwise to a boiling mixture of about 180 parts of deoiled iron into about 180 parts by volume of H$_2$O, about 280 parts by volume of toluene and about 5 parts by volume of glacial acetic acid. After about 3 hours, the reaction mixture is removed from the iron by suction filtration and then extracted with boiling toluene. The water is removed in a separating funnel and the organic phase is removed under vacuum. About 34 parts (91% of theoretical) of 4-chloro-3,5-diaminotoluene, melting point about 116° C. are obtained as white needles from 1:1 benzene/cyclohexane.

Calculated: C 53.6; H 5.8; N 17.9; Cl 22.7. Found: C 53.6; H 5.9; N 17.8; Cl 22.7.

(b) A prepolymer is prepared in a manner analogous to Example 1 but using about 15.7 parts of 4-chloro-3,5-diaminotoluene as chain lengthening agent. The prepolymer is maintained at a temperature of about 90° C. during the addition of the diamine, and after about 15 seconds it is poured into a preheated mold. After about 24 hours heating at about 100° C., the product is removed from the mold.

| | |
|---|---|
| Tensile strength (DIN 53504) | 262 (kg/cm$^2$) |
| Elongation at break (DIN 53504) | 480% |
| Shore hardness A (DIN 53505) | 88 |
| Elasticity (DIN 53512) | 42 |

EXAMPLE 3

The procedure is analogous to that of Example 1, using 1,4-dichloro-3,5-diaminobenzene as chain lengthening agent.

| | |
|---|---|
| Tensile strength (DIN 53504) | 322 (kg/cm$^2$) |
| Elongation at break (DIN 53504) | 642% |
| Shore hardness A (DIN 53505) | 91 |
| Elasticity (DIN 53512) | 38 |

EXAMPLE 4

About 200 parts of polyester are dehydrated as in Example 1 and reacted with about 50.5 parts of 2,4-tolylene diisocyanate at about 120° C. The reaction mixture is then stirred for about 30 minutes and evacuated for about 30 seconds, about 30.6 parts of molten 1,4-dichloro-3,5-diaminobenzene is added and the reaction mixture is then treated as in Example 1.

| | |
|---|---|
| Tensile strength (DIN 53504) | 254 (kg/cm$^2$) |
| Elongation at break (DIN 53504) | 587% |
| Shore hardness A (DIN 53505) | 96 |
| Elasticity (DIN 53512) | 35 |

This product contained about 6.4% of NCO in the prepolymer.

The procedure is the same as in Example 1 but the diisocyanate used is about 58.5 parts of diphenylmethane-4,4'-diisocyanate and the chain lengthening agent about 17.7 parts of 1,4-dichloro-3,5-diaminobenzene.

| | |
|---|---|
| Tensile strength (DIN 53504) | 297 (kg/cm$^2$) |
| Elongation at break (DIN 53504) | 473% |
| Shore hardness A (DIN 53505) | 92 |
| Elasticity (DIN 53512) | 34 |

EXAMPLE 6

About 180 parts of polytetrahydrofuran (average molecular weight about 965) are heated in a vacuum at about 130° C., and about 52.9 parts of tolylene-2,4-diisocyanate are then added at about 120° C.

The reaction mixture is then stirred for about 30 minutes and evacuated for about 30 seconds for the removal of air, and about 14.3 parts of molten 1-chloro-2,6-diaminobenzene are poured in with stirring. After about 24 hours heating at about 100° C., a polyurethane elastomer which has the following properties is obtained.

| | |
|---|---|
| Tensile strength (DIN 53504) | 221 (kg/cm$^2$) |
| Elongation at break (DIN 53504) | 393% |
| Shore hardness A (DIN 53505) | 94 |
| Elasticity (DIN 53512) | 47 |

EXAMPLE 7

The procedure is the same in the preceding example but using about 15.6 parts of 4-chloro-3,5-diaminotoluene as chain lengthening agent.

| | |
|---|---|
| Tensile strength (DIN 53504) | 138 (kg/cm$^2$) |
| Elongation at break (DIN 53504) | 255% |
| Shore hardness A (DIN 53505) | 94 |
| Elasticity (DIN 53512) | 47 |

EXAMPLE 8

(a) About 1200 parts of a polyester of adipic acid and ethylene glycol (OH number 59) are melted at about 130° C. under nitrogen and dehydrated at about 130° C.

About 224 parts of 2,4-tolylene diisocyanate are added with stirring at about 60° C. After about 24 hours storage at about 60° C., a prepolymer which has an NCO content of about 3.95% (based on parts of NCO per parts of prepolymer) and a viscosity of about 900 cP at about 90° C. (measured in a Hoppler viscosimeter) is obtained.

(b) About 106 parts (1 mol) of diethylene glycol are added dropwise to about 380 parts of 2,4-tolylene diisocyanate under nitrogen at about 40° C. to about 50° C. The reaction is terminated after about 2 hours. The prepolymer obtained has an NCO content of about 20.8%.

(c) About 120 parts of the prepolymer according to (a) and about 56.2 parts of the prepolymer according to (b) are degasified by the application of a vacuum at about 100° C. After about one minute, about 21.9 parts of molten 1,4-dichloro-3,5-diaminobenzene are stirred in. The mixture is homogenized for about 30 seconds and then poured into a preheated mold. After being left for about 15 minutes at about 100° C., the product can be removed from the mold, and after about 24 hours at about 100° C. it has the following mechanical properties.

| | |
|---|---|
| Tensile strength (DIN 53504) | 693 (kg/cm²) |
| Elongation at break (DIN 53504) | 539% |
| Shore herdness D (DIN 53505) | 60 |
| Elasticity (DIN 53512) | 41% |

EXAMPLE 9

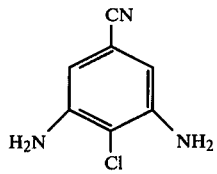

(a) Preparation of 4-chloro-3,5-diaminobenzonitrile.

Nitration of the 4-chlorobenzoic acid yields 3,5-dinitro-4-chlorobenzoic acid, which is converted into the acid chloride with thionyl chloride.

By reaction with ammonia at about 0° C. to about 20° C., 4-chloro-3,5-dinitrobenzoic acid amide is obtained which is converted into 4-chloro-3,5-dinitrobenzonitrile by reaction with phosphorus oxychloride in boiling toluene. By reduction in boiling toluene/water with iron, 4-chloro-3,5-diaminobenzonitrile (melting point about 172° C.) is obtained in about 80% yield.

| Elementary analysis: $C_7H_6ClN_3$ | C | H | Cl | N |
|---|---|---|---|---|
| Calculated: | 50.2 | 3.6 | 21.1 | 25.1 |
| Found: | 50.3 | 3.7 | 20.9 | 25.0 |

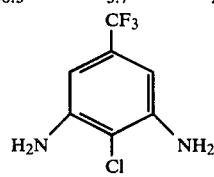

Preparation of 4-chloro-3,5-diamino-trifluoromethylbenzene

By nitration of P-chloro-trifluoromethylbenzene at about 100° C. in a mixture of nitric acid and oleum, benzene is obtained which by reduction in iron in a boiling mixture of toluene and water yields 4-chloro-3,5-diamino-trifluoromethylbenzene (melting point about 96° C.) in about 80% yield.

| Elementary analysis: $C_7H_6ClF_3N_2$ | C | H | Cl | F | N |
|---|---|---|---|---|---|
| Calculated: | 40.0 | 2.9 | 13.4 | 27.1 | 16.9 |
| Found: | 40.2 | 3.0 | 13.3 | 27.0 | 16.8 |

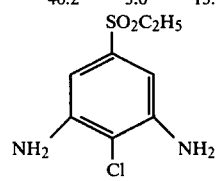

(c) Preparation of ethyl-(4-chloro-3,5-diamino)-phenylsulphone.

By reaction with a mixture of nitric acid and oleum at about 140° C., ethyl-4-chlorophenylsulphone is converted into ethyl-4-chloro-3,5-dinitrophenylsulphone which is converted into ethyl-(4-chloro-3,5-diamino)-phenylsulphone (melting point about 115° C.) with an about 80% yield by reacting it with iron in a boiling mixture of toluene and water.

| Elementary analysis: $C_8H_{11}ClN_2O_2S$ | C | H | Cl | N | S |
|---|---|---|---|---|---|
| Calculated: | 40.9 | 4.7 | 15.1 | 11.9 | 13.7 |
| Found: | 40.9 | 4.7 | 15.0 | 11.9 | 13.5 |

Preparation of the polyurethane

About 200 parts of a polyester of adipic acid and ethylene glycol (OH number 56) are dehydrated at about 130° C. About 40 parts of a mixture of about 80% of 2,4- and about 20% of 2,6-tolylene diisocyanate are added at about 120° C. and the reaction mixture is left at this temperature for about 30 minutes. About 0.1 mol of the diamines according to (a), (b) or (c) are added in the molten form.

The mixture is homogenized for about 30 seconds and then poured into molds.

By subsequently heating the product at about 100° C., polyurethanes which have the following mechanical properties are obtained after about 24 hours.

| Diamine | A | B | C |
|---|---|---|---|
| Tensile strength (DIN 53504) kg/cm² | 212 | 332 | 334 |
| Elongation at break (DIN 53504) % | 453 | 650 | 592 |
| Permanent elongation after tearing % | 8 | 10 | 8 |
| Dimensional stability kg wt | 45 | 43 | 55 |
| Shore hardness (DIN 53505) A | 88 | 80 | 85 |
| Elasticity (DIN 53512) % | 34 | 27 | 31 |

Although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. Polyurethane elastomers which contain structural units having the formula

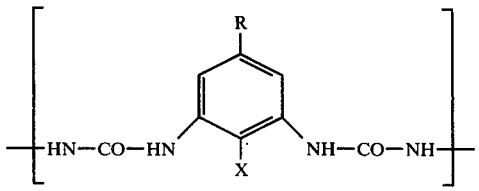

wherein

R represents a hydrogen atom or $C_1$ to $C_4$ alkyl radicals, and

X represents fluorine, chlorine or bromine atoms.

2. The polyurethane elastomers of claim 1 wherein X is a chlorine atom.

* * * * *